(12) United States Patent
Zhang et al.

(10) Patent No.: US 9,712,590 B2
(45) Date of Patent: Jul. 18, 2017

(54) METHOD AND DEVICE FOR TRANSMITTING STREAMING MEDIA

(71) Applicant: HUAWEI TECHNOLOGIES CO., LTD., Shenzhen (CN)

(72) Inventors: Shaobo Zhang, Shenzhen (CN); Xin Wang, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 499 days.

(21) Appl. No.: 14/085,099

(22) Filed: Nov. 20, 2013

(65) Prior Publication Data

US 2014/0089518 A1    Mar. 27, 2014

Related U.S. Application Data

(63) Continuation of application No. PCT/CN2011/080449, filed on Sep. 30, 2011.

(51) Int. Cl.
*G06F 15/16* (2006.01)
*H04L 29/06* (2006.01)
(Continued)

(52) U.S. Cl.
CPC .......... *H04L 65/607* (2013.01); *G11B 27/034* (2013.01); *H04L 29/0651* (2013.01);
(Continued)

(58) Field of Classification Search
CPC ...................... H04L 29/06448–29/0651; H04L 65/60–65/607; H04N 21/845–21/8456
See application file for complete search history.

(56) References Cited

U.S. PATENT DOCUMENTS 7,486,873 B2    2/2009    Kim et al.
7,809,914 B2    10/2010    Kottomtharayil et al.
(Continued)

FOREIGN PATENT DOCUMENTS

CN    1784898 A    6/2006
CN    101141627 A    3/2008
(Continued)

OTHER PUBLICATIONS

"Client", The Authoritative Dictionary of IEEE Standard Terms. 7th ed. 2000.*
"Server", The Authoritative Dictionary of IEEE Standard Terms. 7th ed. 2000.*
3rd Generation Partnership Project; Technical Specification Group Services and System Aspects; Transparent end-to-end Packet-switched Streaming Service (PSS); Protocols and codecs (Release 9). Technical Specification: 3GPP TS 26.234 V9.0.0 (Sep. 2009). Valbonne, France: 3rd Generation Partnership Project. 2009. pp. 1-167.
(Continued)

*Primary Examiner* — Brendan Higa
(74) *Attorney, Agent, or Firm* — Huawei Technologies Co., Ltd.

(57) ABSTRACT

A method and a device for transmitting streaming media are provided. The method includes: generating at least one index segment, where the at least one index segment includes index information of at least one media segment, and the at least one index segment is independent of the at least one media segment; generating storage location information corresponding to the at least one index segment according to a generation rule of the storage location information corresponding to the at least one index segment; and storing the at least one index segment at a storage location corresponding to the storage location information, so that a client can obtain the at least one index segment from the storage location.

23 Claims, 6 Drawing Sheets

(51) Int. Cl.
*H04N 21/262* (2011.01)
*H04N 21/472* (2011.01)
*H04N 21/845* (2011.01)
*G11B 27/034* (2006.01)
*H04L 29/08* (2006.01)

(52) U.S. Cl.
CPC .......... *H04L 65/4084* (2013.01); *H04L 67/06* (2013.01); *H04N 21/26258* (2013.01); *H04N 21/47202* (2013.01); *H04N 21/8456* (2013.01)

(56) References Cited

U.S. PATENT DOCUMENTS

| | | |
|---|---|---|
| 2004/0088728 A1 | 5/2004 | Shimizu |
| 2006/0034583 A1 | 2/2006 | Shimizu |
| 2006/0098942 A1 | 5/2006 | Kim et al. .................. 386/68 |
| 2006/0224852 A1 | 10/2006 | Kottomtharayil et al. |
| 2007/0115929 A1 | 5/2007 | Collins et al. |
| 2008/0060029 A1 | 3/2008 | Park et al. |
| 2010/0241757 A1 | 9/2010 | Hu et al. .................. 709/231 |
| 2010/0318600 A1 | 12/2010 | Furbeck |
| 2011/0231519 A1 | 9/2011 | Luby et al. |
| 2012/0110138 A1 | 5/2012 | Zhang ...................... 709/219 |
| 2014/0325020 A1 | 10/2014 | Igarashi |

FOREIGN PATENT DOCUMENTS

| | | |
|---|---|---|
| CN | 101552800 A | 10/2009 |
| CN | 101656094 A | 2/2010 |
| CN | 101951412 A | 1/2011 |
| JP | 2004140536 A | 5/2004 |
| JP | 2011087103 A | 4/2011 |
| KR | 20040056497 A | 7/2004 |
| RU | 2393638 C2 | 6/2010 |
| WO | 0208948 A2 | 1/2002 |
| WO | 2005006748 A1 | 1/2005 |
| WO | 2011038013 A2 | 3/2011 |
| WO | 2011059273 A2 | 5/2011 |
| WO | 2011070552 A1 | 6/2011 |

OTHER PUBLICATIONS

N11339, Requirements Group. "Use Cases for HTTP Streaming of MPEG Media." Drafted document of ISO/IEC JTC1/SC29/WG11 Coding of Moving Pictures and Audio, International Organisation for Standardisation, Dresden, Germany, Apr. 2010. pp. 1-4.
N11340, Requirements Group. "Requirements on HTTP Streaming of MPEG Media." Document of ISO/IEC JTC1/SC29/WG11 Coding of Moving Pictures and Audio, International Organisation for Standardisation, Dresden, Germany, Apr. 2010. pp. 1-5.
Fröjdh, Per (Ed.), and Thomas Stockhammer (Ed.). 23001-6 WD (DASH), MPEG-4 Systems. "WD 0.1 of 23001-6 Dynamic Adaptive Streaming over HTTP (DASH)." Document of ISO/IEC JTC1/SC29/WG11 Coding of Moving Pictures and Audio, International Organisation for Standardisation, Geneva, Switzerland, Jul. 30, 2010. pp. 1-12.
International Search Report issued Jul. 5, 2012, in corresponding International Application No. PCT/CN2011/080449.
"Segments and Segment Information", 3GPP TS 26.247 V10.0.0, Jun. 2011, total 5 pages.
"Information technology—MPEG systems technologies—Part 6: Dynamic adaptive streaming over HTTP (DASH)", FCD 23001-6, ISO/IEC JTC 1/SC 29/WG 11, Jan. 28, 2011, total 109 pages.
R. Pantos Ed et al: "HTTP Live Streaming, draft-pantos-http-live-streaming-06", Apple Inc, Mar. 31, 2011, total 24 pages.
"Universal Mobile Telecommunications System (UMTS);LTE; Transparent end-to-end Packet-switched Streaming Service (PSS); Progressive Download and Dynamic Adaptive Streaming over HTTP (3GP-DASH) (3GPP TS 26.247 version 10.0.0 Release 10)", ETSI TS 126 247 V10.0.0, Jun. 2011, total 96 pages.
"HTTP streaming-the static content serving mode", Huawei Technologies Co., Ltd, 3GPP TSF-SA4#56 090875, total 11 pages.
International Search Report mailed Jul. 5, 2012 in corresponding International Application No. PCT/CN2011/080449.

* cited by examiner

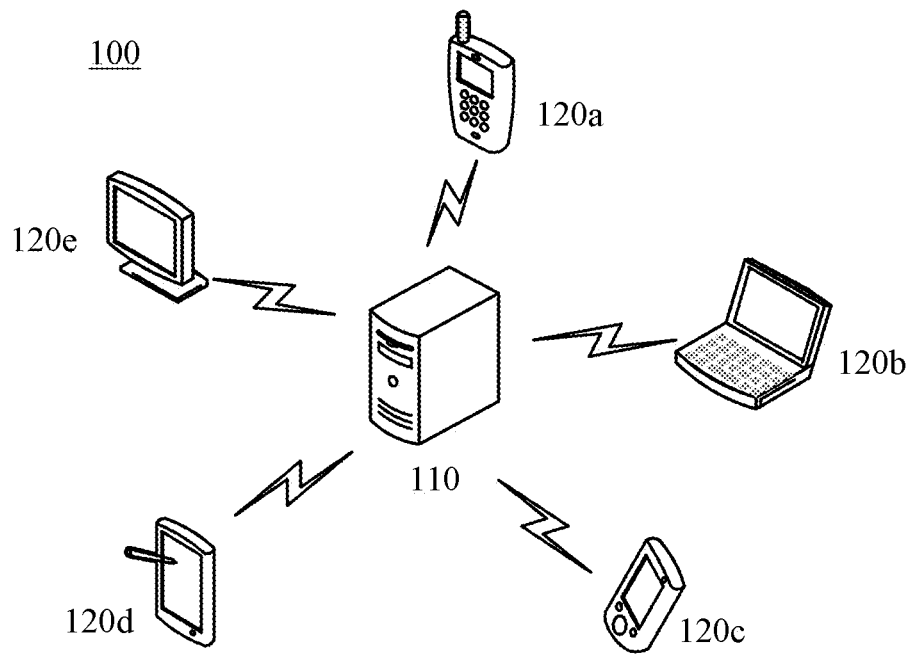

FIG. 1

| Generate at least one index segment, where the at least one index segment includes index information of at least one media segment, and the at least one index segment is independent of the at least one media segment | 210 |

| Generate storage location information corresponding to the at least one index segment according to a generation rule of the storage location information corresponding to the at least one index segment | 220 |

| Store the at least one index segment on a storage location corresponding to the storage location information, so that a client obtains the at least one index segment from the storage location | 230 |

FIG. 2

METHOD AND DEVICE FOR TRANSMITTING STREAMING MEDIA

CROSS-REFERENCE TO RELATED APPLICATIONS

This application is a continuation of International Application No. PCT/CN2011/080449, filed on Sep. 30, 2011, which is hereby incorporated by reference in their entireties.

FIELD OF THE INVENTION

Embodiments of the present invention relate to the field of communications, and in particular, to a method and a device for transmitting streaming media.

BACKGROUND OF THE INVENTION

With the popularization of the Internet, streaming media services are developing rapidly, and one of the important forms, namely, a streaming media service based on the HTTP (HyperText Transfer Protocol, hypertext transfer protocol), is becoming a developing trend.

In the streaming media service based on the HTTP, contents are encoded into multiple versions with different rates according to different encoding parameters (such as resolution), which is referred to as encoding representation (representation). The encoding representation is divided into several media segments along a time direction. The media segment is a data unit of HTTP transmission, and can be accessed uniquely through a URL (Uniform Resource Locator, uniform resource locator). A client first obtains a media presentation description (Media Presentation Description, MPD) file, which is a metadata file and provides the client with information of how to access a media segment. Then, the client continuously obtains and processes media segments according to the information in the media presentation description file, to implement the streaming media service. When available bandwidth changes, the client correspondingly chooses a media segment of an encoding representation with a higher or lower rate, to adapt to the changed bandwidth.

Index information of the media segment provides metadata of the media segment. Global metadata includes: presentation start time of the media segment, a presentation duration, a time position of an indicative media segment in a media representation. Local metadata includes: a media segment duration, accessible subsegments (subsegments) in the media segment, a location of the subsegment, whether the subsegment includes a stream access point (Stream Access Point, SAP) of a media component, and a time position of the stream access point. The index information of the media segment is important to switching of the encoding representation. The client can only start decoding and processing the encoding representation from the stream access point. Therefore, a stream access point has to be found in the media segment of a new encoding representation, while downloading and translation of an old encoding representation should last until the time corresponding to the stream access point.

In design of 3GPP (3rd Generation Partnership Project, 3rd generation partnership project), the index information of the media segment is stored in a media segment index element and is a part of the media segment. The index information of the media segment is transmitted together with other contents of the media segment, which is not necessary in all cases, and may lead to unnecessary data transmission and a waste of bandwidth. The reason is that, the index information of the media segment is only required during encoding presentation switching or time seeking (seeking). In other cases, only media segments in the same encoding representation need to be requested to be downloaded in sequence, while index information of the media segments is not required.

SUMMARY OF THE INVENTION

Embodiments of the present invention provide a method and a device for transmitting streaming media, which is capable of reducing unnecessary data transmission.

In one aspect, a method for transmitting streaming media is provided, including: generating at least one index segment, where the at least one index segment includes index information of at least one media segment, and the at least one index segment is independent of the at least one media segment; generating storage location information corresponding to the at least one index segment according to a generation rule of the storage location information corresponding to the at least one index segment; and storing the at least one index segment at a storage location corresponding to the storage location information, so that a client can obtain the at least one index segment from the storage location.

In another aspect, a method for transmitting streaming media is provided, including: obtaining a generation rule of storage location information corresponding to at least one index segment, where the at least one index segment includes index information of at least one media segment, and the at least one index segment is independent of the at least one media segment; generating the storage location information corresponding to the at least one index segment according to the generation rule; and obtaining the at least one index segment from a storage location corresponding to the storage location information.

In another aspect, a device for transmitting streaming media is provided, including: a first generation module, configured to generate at least one index segment, where the at least one index segment includes index information of at least one media segment, and the at least one index segment is independent of the at least one media segment; a second generation module, configured to generate storage location information corresponding to the at least one index segment according to a generation rule of the storage location information corresponding to the at least one index segment; and a storage module, configured to store the at least one index segment at a storage location corresponding to the storage location information, so that a client can obtain the at least one index segment from the storage location.

In another aspect, a device for transmitting streaming media is provided, including: a first obtaining module, configured to obtain a generation rule of storage location information corresponding to at least one index segment, where the at least one index segment includes index information of at least one media segment, and the at least one index segment is independent of the at least one media segment; a generation module, configured to generate the storage location information corresponding to the at least one index segment according to the generation rule; and a second obtaining module, configured to obtain the at least one index segment from a storage location corresponding to the storage location information.

In the embodiments of the present invention, index information of a media segment is provided by an index segment independent of the media segment, so that a client can obtain the index segment according to requirements, thereby reducing unnecessary data transmission and saving bandwidth.

BRIEF DESCRIPTION OF THE DRAWINGS

To illustrate the technical solutions according to the embodiments of the present invention more clearly, the accompanying drawings required for describing the embodiments or the prior art are introduced below briefly. Apparently, the accompanying drawings in the following descriptions merely show some embodiments of the present invention, and persons of ordinary skill in the art can obtain other drawings according to the accompanying drawings without creative efforts.

FIG. 1 is a schematic structural diagram of a system where embodiments of the present invention are applicable;

FIG. 2 is a schematic flow chart of a method for transmitting streaming media according to an embodiment of the present invention;

DETAILED DESCRIPTION OF THE EMBODIMENTS

Figure 3:
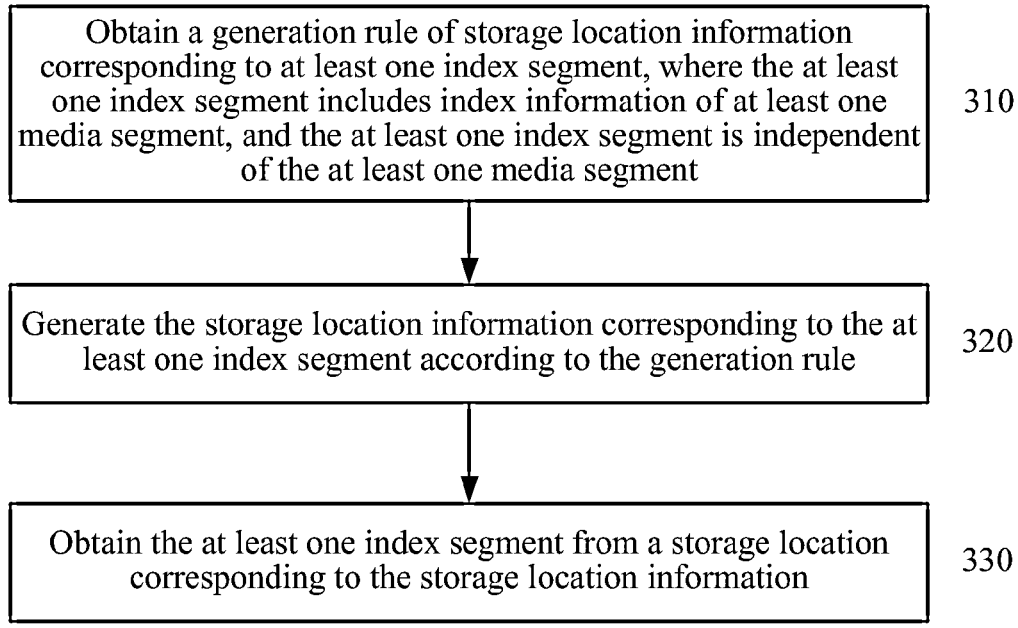
FIG. 3 is a schematic flow chart of a method for transmitting streaming media according to an embodiment of the present invention.

The technical solutions in the embodiments of the present invention will be clearly and completely described in the following with reference to the accompanying drawings in the embodiments of the present invention. It is obvious that the embodiments to be described are a part rather than all of the embodiments of the present invention. All other embodiments obtained by persons of ordinary skill in the art based on the embodiments of the present invention without creative efforts shall fall within the protection scope of the present invention.

FIG. 1 is a schematic structural diagram of a system where embodiments of the present invention are applicable. A system 100 may include a server 110 and clients 120a, 120b, 120c, 120d, 120e and so on (which are collectively referred to as a client 120 in the following).

The server 110 may include but is not limited to a streaming media server, and the client 120 may include but is not limited to a mobile phone 120a, a portable computer 120b, a personal digital assistant (PDA) 120c, a portable game console 120d and a portable multimedia machine 120e. The server 110 and the client 120 shown in FIG. 1 are merely exemplary, and the specific type of the server 110 and the specific type of the client 120 do not constitute a limitation on the scope of the present invention.

The server 110 stores streaming media data and a media presentation description file, where the streaming media data may be audio streams, video streams or the like, and the media presentation description file is a metadata file that provides the client with information of how to access a media segment. The client 120 first obtains the media presentation description file, and according to information in the media presentation description file, the client 120 continuously obtains and processes media segments, to implement a streaming media service.

FIG. 2 is a schematic flow chart of a method for transmitting streaming media according to an embodiment of the present invention. The method of FIG. 2 is executed by a server (for example, the server 110 in FIG. 1).

210: Generate at least one index segment, where the at least one index segment includes index information of at least one media segment, and the at least one index segment is independent of the at least one media segment.

Optionally, in another embodiment, the at least one media segment may belong to one encoding representation, or may belong to multiple encoding representations.

Optionally, in another embodiment, the at least one index segment is temporally continuous, and has a continuous sequence number.

Optionally, in an embodiment, the index segment further includes at least one of the following: an identifier of the encoding representation to which the at least one media segment belongs, an identifier of the at least one media segment, and an identifier of a subsegment in the at least one media segment.

220: Generate storage location information corresponding to the at least one index segment according to a generation rule of the storage location information corresponding to the at least one index segment.

Optionally, in an embodiment, the server may establish a generation rule of storage location information corresponding to the at least one index segment. However, the embodiment of the present invention does not set any limitation, and the generation rule may also be established by other devices. Alternatively, the generation rule may be preset in the server.

Optionally, in another embodiment, the generation rule may be indicated through a URL template. The embodiment of the present invention does not set any limitation, and the generation rule may also be indicated in any other manner.

230: Store the at least one index segment at a storage location corresponding to the storage location information, so that a client can obtain the at least one index segment from the storage location.

Optionally, in an embodiment, the server may receive a request for a specific index segment in the at least one index segment from the client, where the request carries storage location information corresponding to the specific index segment; and send the specific index segment to the client.

In the embodiment of the present invention, the index information of the media segment is provided by the index segment independent of the media segment, so that the client can obtain the index segment according to requirements, thereby reducing unnecessary data transmission and saving bandwidth.

In addition, in the embodiment of the present invention, a format of the media segment may not be changed, an existing content preparation device can still be used, and an existing encoding representation can still be used, thereby saving transformation cost. In addition, according to the embodiment of the present invention, more metadata may be further allowed to be encapsulated in the index segment, so as to improve transmission efficiency.

FIG. 3 is a schematic flow chart of a method for transmitting streaming media according to an embodiment of the present invention. The method of FIG. 3 is executed by a client (for example, the client 120 in FIG. 1).

310: Obtain a generation rule of storage location information corresponding to at least one index segment, where the at least one index segment includes index information of at least one media segment, and the at least one index segment is independent of the at least one media segment.

Optionally, in an embodiment, the client may obtain a media presentation description file, where the media presentation description file carries the generation rule.

Optionally, in another embodiment, the generation rule may be indicated through a URL template.

Optionally, in another embodiment, the at least one media segment may belong to one encoding representation, or may belong to multiple encoding representations.

Optionally, in another embodiment, the at least one index segment is temporally continuous, and has a continuous sequence number.

Optionally, in another embodiment, the at least one index segment further includes at least one of the following: an identifier of the encoding representation to which the at least one media segment belongs, an identifier of the at least one media segment, and an identifier of a subsegment in the at least one media segment.

320: Generate the storage location information corresponding to the at least one index segment according to the generation rule.

For example, if the generation rule is indicated through the URL template, the generated storage location information may be a URL.

330: Obtain the at least one index segment from a storage location corresponding to the storage location information.

Optionally, in an embodiment, the client may send a request for a specific index segment in the at least one index segment to the server, where the request carries storage location information corresponding to the specific index segment; and receive the specific index segment from the server.

In the embodiment of the present invention, the index information of the media segment is provided by the index segment independent of the media segment, so that the client can obtain the index segment according to requirements, thereby reducing unnecessary data transmission and saving bandwidth.

In addition, in the embodiment of the present invention, a format of the media segment may not be changed, an existing content preparation device can still be used, and an existing encoding representation can still be used, thereby saving transformation cost. In addition, according to the embodiment of the present invention, more metadata may be further allowed to be encapsulated in the index segment, so as to improve transmission efficiency.

Figure 4:
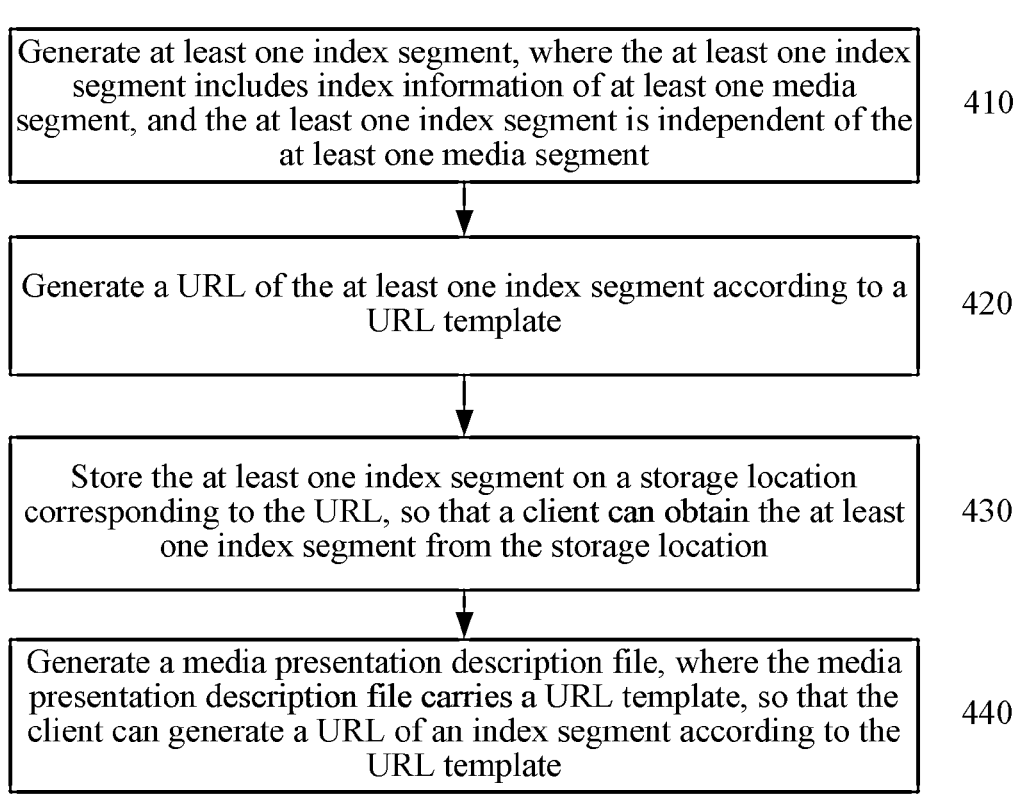
FIG. 4 is a schematic flow chart of a method for transmitting streaming media according to another embodiment of the present invention.

Embodiments of the present invention are described in further detail below through specific examples. FIG. 4 is a schematic flow chart of a method for transmitting streaming media according to another embodiment of the present invention. The method of FIG. 4 is executed by a server (for example, the server 110 in FIG. 1). In FIG. 4, a URL template indicating a generation rule of storage location information of an index segment is taken as an example for description.

410: Generate at least one index segment, where the at least one index segment includes index information of at least one media segment, and the at least one index segment is independent of the at least one media segment.

420: Generate a URL of the at least one index segment according to a URL template.

430: Store the at least one index segment at a storage location corresponding to the URL, so that a client can obtain the at least one index segment from the storage location.

Optionally, in an embodiment, the server may receive a request for a specific index segment in the at least one index segment from the client, where the request carries a URL corresponding to the specific index segment; and send the specific index segment to the client.

440: Generate a media presentation description file, where the media presentation description file carries a URL template, so that the client can generate a URL of the index segment according to the URL template.

Optionally, in an embodiment, the media presentation description file may further carry a duration of the index segment. If the duration of the index segment is consist with a duration of the media segment, only the duration of the media segment needs to be described in the media presentation description file, while the duration of the index segment may be omitted.

It should be understood that, the sequence numbers of the above processes do not indicate an execution sequence. The execution sequence of the processes should be determined based on functions and internal logics thereof, and should not constitute any limitation on the implementing process of the embodiment of the present invention.

In the embodiment of the present invention, the index information of the media segment is provided by the index segment independent of the media segment, so that the client can obtain the index segment according to requirements, thereby reducing unnecessary data transmission and saving bandwidth.

In addition, in the embodiment of the present invention, a format of the media segment may not be changed, an existing content preparation device can still be used, and an existing encoding representation can still be used, thereby saving transformation cost. In addition, according to the embodiment of the present invention, more metadata may be further allowed to be encapsulated in the index segment, so as to improve transmission efficiency.

Figure 5:
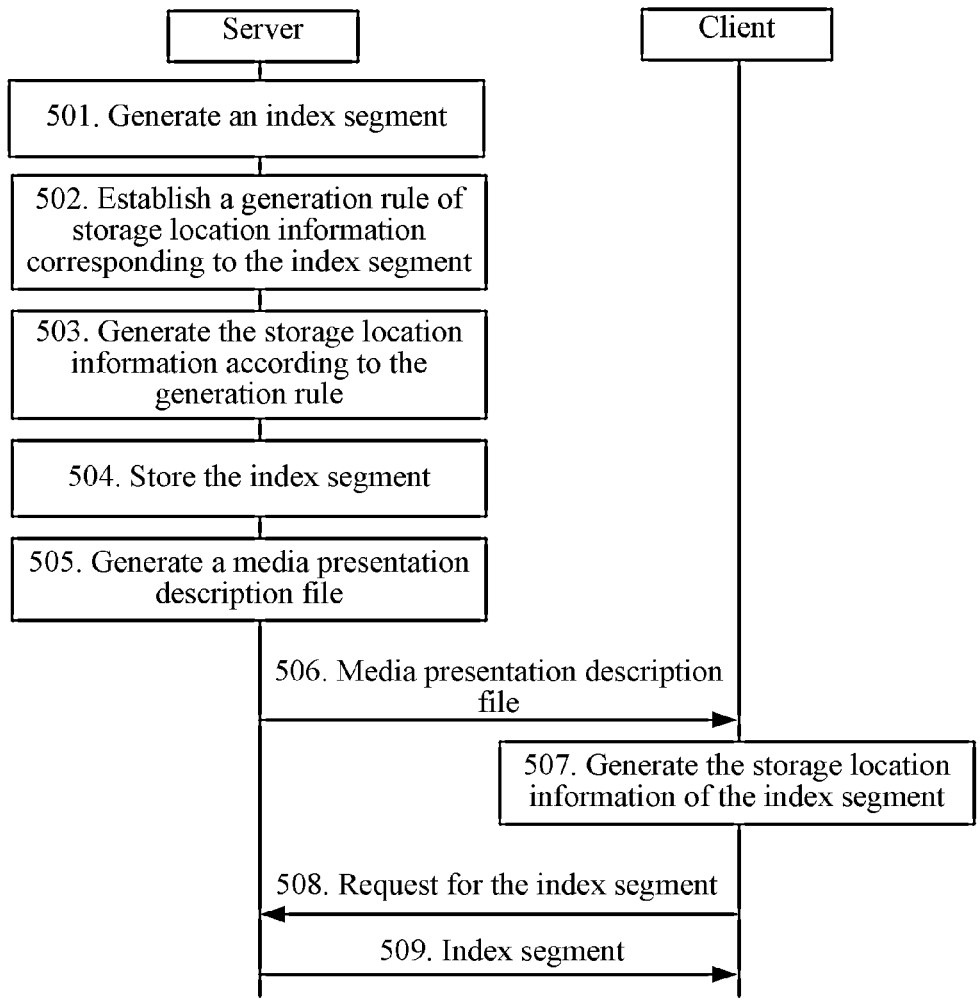
FIG. 5 is a schematic flow chart of a process for transmitting streaming media according to another embodiment of the present invention.

FIG. 5 is a schematic flow chart of a process for transmitting streaming media according to another embodiment of the present invention.

501: A server generates at least one index segment, where the index segment includes index information of at least one media segment, and the index segment is independent of the media segment.

For example, the index segments may be temporally continuous, and have continuous sequence numbers and certain durations. For example, a sequence number of a first index segment is 1, a sequence number of a second index segment is 2, and the sequence numbers are in ascending order. Each index segment describes index information of at least one media segment of one or more encoding representations within a time range.

The index segment may have multiple structural layers, such as encoding representation, media segment and subsegment, and may include an identifier of an encoding representation to which the at least one media segment belongs, an identifier of the at least one media segment or an identifier of a subsegment in the at least one media segment.

For example, if the index segment only provides index information of one media segment of one encoding representation, a structure may be simplified correspondingly, for example, the layers corresponding to the encoding representation and media segment may be deleted.

502: The server establishes a generation rule of storage location information corresponding to the at least one index segment.

The generation rule is established by the server, but the embodiment of the present invention is not limited thereto. The generation rule may also be established in other manners.

503: Generate the storage location information corresponding to the at least one index segment according to the generation rule.

If the storage location information adopts the form of a URL, the generation rule may be indicated through a URL template. A time range covered by the index segment is corresponding to the sequence number of the index segment in a one-to-one manner. The time range and the sequence number can be derived based on each other. The URL of the index segment can be obtained by replacing an index element in the URL template with the sequence number of the index segment.

For example, the URL template may be a character string which includes a replaceable parameter, such as "http://abc.example.com/meclia/indexsegment<index>.idx", where <index> indicates a replacement item of the sequence number of the index segment, and the URL of the index segment can be generated by replacing the item with the sequence number of the index segment.

504: The server stores the at least one index segment at a storage location corresponding to the storage location information.

505: The server generates a media presentation description file, where the media presentation description file carries the generation rule of the storage location information of the at least one index segment.

For example, if the generation rule is indicated through the URL template, the URL template may be included in the media presentation description file and represented as an attribute item in the media presentation description file.

In addition, a duration of the index segment may be indicated explicitly or implicitly in the media presentation description file. If the duration of the index segment is consistent with a duration of the media segment, only the duration of the media segment needs to be described in the media presentation description file, while the duration of the index segment may be omitted.

As mentioned above, the index information included in the index segment may come from media segments of one or more encoding representations, and correspondingly, an index segment template is corresponding to one or more encoding representations. Such correspondence is reflected by a location of the index segment template in the media presentation description file. For example, the media presentation description file includes several encoding representation element sets, namely, RepresentationSet, and the element set further includes several encoding representation sub-elements, namely, Representation. The URL template of the index segment is indicated by an attribute item @indexSegmentUrlIndex. The duration of the index segment is fixed, and is indicated by an attribute item @indexDuration. If the attribute items belong to one encoding representation element, that is, an attribute item is an attribute item of the encoding representation element or an attribute item of the encoding representation sub-element, the index segment template is corresponding to the encoding representation only. If the attribute items belong to the element set RepresentationSet including several encoding representations, the index segment template is corresponding to all the encoding representations in the set.

506: The server obtains the media presentation description file from the server.

Optionally, it is not limited that the client obtains the media presentation description file from the server through a GET operation of the HTTP, and the media presentation description file may also be obtained in other manners, such as broadcast and email.

It should be noted that, in the embodiment of FIG. 5, the client obtains the media presentation description file from the server, but the embodiment of the present invention is not limited thereto. The client may also obtain the media presentation description file from other devices.

507: The client generates the storage location information of the index segment according to the generation rule carried in the media presentation description file.

For example, the media presentation description file may also carry the duration of the index segment. The client may also generate the storage location information of the index segment according to the generation rule and the duration of the index segment carried in the media presentation description file. If the duration of the index segment is consistent with a duration of the media segment, only the duration of the media segment needs to be described in the media presentation description file, while the duration of the index segment may be omitted.

For example, the generation rule may be indicated through a uniform resource locator template, and the generation method is similar to the method in 503. To avoid repetition, the method is not described in detail herein again.

508: The client requests the index segment from the server.

For example, during encoding representation switching or client seeking as transmission bandwidth changes, the client requests the index segment from the server. A request sent from the client to the server may carry the storage location information generated in step 507.

509: The server sends the index segment request by the client to the client.

It should be understood that, the sequence numbers of the above processes do not indicate an execution sequence. The execution sequence of the processes should be determined based on functions and internal logics thereof, and should not constitute any limitation to the implementing process of the embodiment of the present invention.

In the embodiment of the present invention, the index information of the media segment is provided by the index segment independent of the media segment, so that the client can obtain the index segment according to requirements, thereby reducing unnecessary data transmission and saving bandwidth.

In addition, in the embodiment of the present invention, a format of the media segment may not be changed, an existing content preparation device can still be used, and an existing encoding representation can still be used, thereby saving transformation cost. In addition, according to the embodiment of the present invention, more metadata may be further allowed to be encapsulated in the index segment, so as to improve transmission efficiency.

Figure 6A:
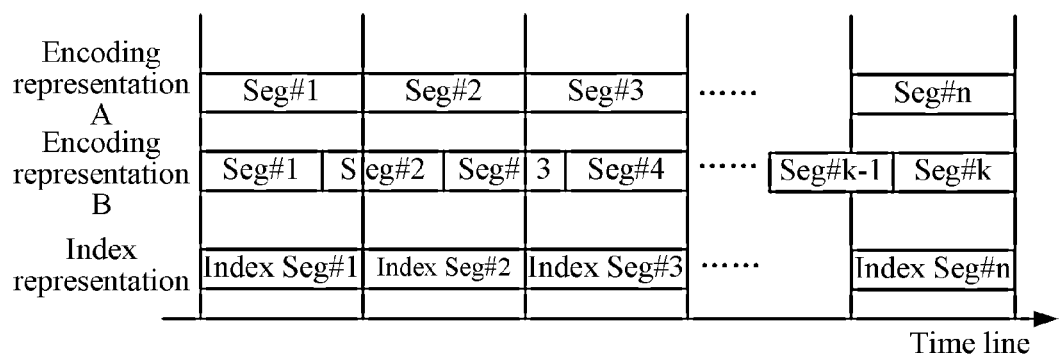
FIG. 6A to FIG. 6C are schematic diagrams of correspondence between index segments and media segments.
Figure 6B:
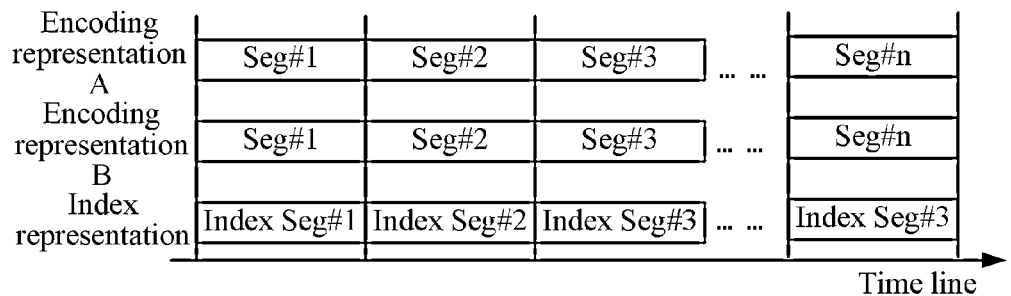
Figure 6C:
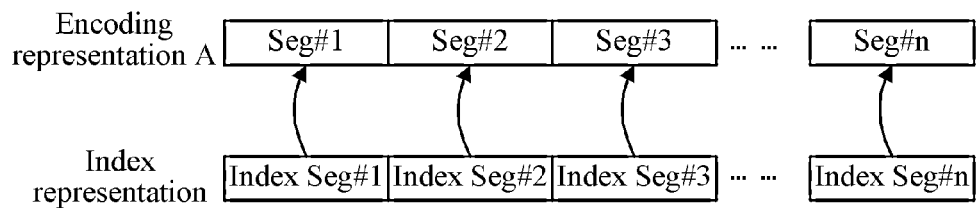

FIG. 6A to FIG. 6C are schematic diagrams of correspondence between index segments and media segments.

Durations of the index segments, indexDuration, are the same, and the duration of a last index segment may be exceptional, and may be shorter than a normal duration. Relative to reference time, the start time of an index segment with the sequence number being i is (i−1)*indexDuration, and end time is i*indexDuration. The end time of the last index segment is end time of a media presentation.

Optionally, in an embodiment, an index segment includes index information of media segments from multiple encoding representations, and durations of the media segments of different encoding representations may be different. Therefore, time boundaries of the index segments and time boundaries of the media segments may not be aligned. Some media segments partially fall within the time range of the index segments, and the index segments only record index information of these media segments that fall within the time range of the index segments. For example, in FIG. 6A, an encoding representation A includes media segments Seg#1, Seg#2, Seg#3, . . . , Seg#n. An encoding representation B includes media segments Seg#1, Seg#2, Seg#3, . . . , Seg#k. An index representation includes index segments Index Seg#1, Index Seg#2, Index Seg#3, . . . , Index Seg#n. An index segment 1 includes index information of media segments Seg(A,1), Seg(B,1) and Seg(B,2), where Seg(X,i) indicates an $i^{th}$ media segment in an encoding representation X. n and k are positive integers.

Optionally, in another embodiment, as shown in FIG. 6B, an encoding representation A and an encoding representation B each include media segments Seg#1, Seg#2, Seg#3, . . . , Seg#n. An index representation includes index segments Index Seg#1, Index Seg#2, Index Seg#3, . . . , Index Seg#n. The media segments of the encoding representations are temporally aligned. The duration of an index segment and the duration of a media segment are the same. The index segment includes index information of a media segment of each encoding representation in the same time range. In this way, boundaries of the index segments and indexed media segments are aligned. n is a positive integer.

However, it is a demanding requirement that media segments of different encoding representations are temporally aligned, which is not always met. Optionally, in another embodiment, as shown in FIG. 6C, an encoding representation A includes media segments Seg#1, Seg#2, Seg#3, . . . , Seg#n. An index representation includes index segments Index Seg#1, Index Seg#2, Index Seg#3, . . . , Index Seg#n. An index segment only includes index information of one media segment of one encoding representation. The duration of an index segment is equal to the duration of a media segment. In this way, it is not required that media segments of different encoding representations are temporally aligned. n is a positive integer.

Optionally, in another embodiment, the index segment may be corresponding to one encoding representation and include information of multiple media segments from one encoding representation. The duration of the index segment is the sum of durations of multiple indexed media segments.

In the embodiment of the present invention, the index information of the media segment is provided by the index segment independent of the media segment, so that the client can obtain the index segment according to requirements, thereby reducing unnecessary data transmission and saving bandwidth.

Figure 7:
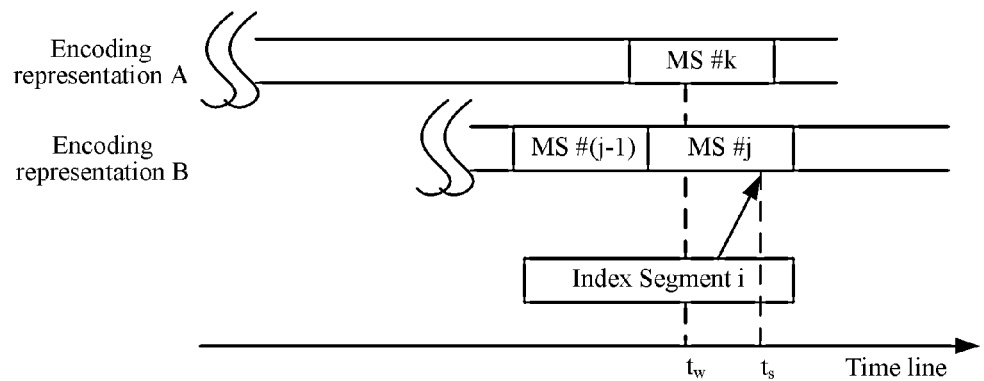
FIG. 7 is a schematic diagram of streaming media switching/seeking according to an embodiment of the present invention.

FIG. 7 is a schematic diagram of streaming media switching/time seeking according to an embodiment of the present invention.

For example, a generation rule of storage location information of an index segment is indicated through a URL template. A client generates a URL of the index segment according to a corresponding parameter of the template.

During the switching or time seeking of an encoding representation, the client requests an index segment that covers specified time, obtains information of a stream access point and subsegment information in a corresponding media segment, and determines an accurate switching time and seeking point.

For example, as shown in FIG. 7, the client switches from an encoding representation A to an encoding representation B, where $t_w$ is a time point for determining the switching, and an access point as closest to $t_w$ as possible needs to be found in the encoding representation B. The client finds an index segment including the time position $t_w$, and the sequence number of the index segment is i. A generated URL obtains a corresponding index segment, and a stream access point meeting a condition is searched for. As the location of the stream access point is uncertain, if a proper stream access point is not found in the index segment i, an adjacent index segment may be accessed, for example, an index segment (i−1) or an index segment (i+1). For example, in this embodiment, a proper stream access point is found in a subsegment of a media segment MS #j of the encoding representation B, where the time point thereof is $t_s$, and the switching of the encoding representation is performed at $t_s$. The client requests data in the encoding representation A until the time point $t_s$ and requests data starting from $t_s$ in the media segment j of the encoding representation B and requests subsequent media segments. The client continuously plays the encoding representation A until the time point $t_s$, and then starts to play media data of the encoding representation B to complete switching.

Therefore, in the embodiment of the present invention, the index information of the media segment is provided by the index segment independent of the media segment, and the index segment is requested only when switching or time seeking is performed. The accurate switching time and seeking point can be determined to complete the switching or time seeking, thereby avoiding transmission of unnecessary data.

Figure 8:
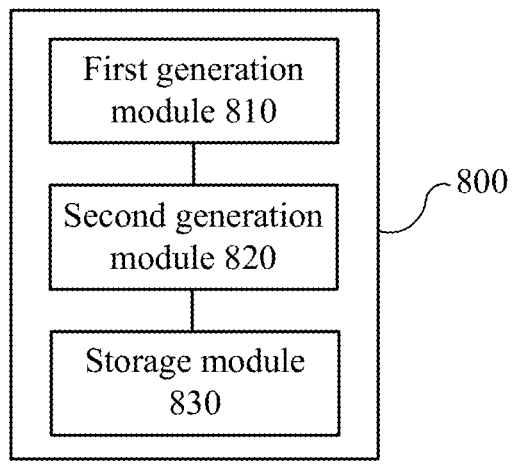
FIG. 8 is a block diagram of a device for transmitting streaming media according to an embodiment of the present invention.

FIG. 8 is a block diagram of a device for transmitting streaming media according to an embodiment of the present invention. An example of a device 800 of FIG. 8 is a server (for example, the server 110 in FIG. 1). The device 800 includes a first generation module 810, a second generation module 820 and a storage module 830.

The first generation module 810 generates at least one index segment, where the at least one index segment includes index information of at least one media segment, and the at least one index segment is independent of the at least one media segment. The second generation module 820 generates storage location information corresponding to the at least one index segment according to a generation rule of the storage location information corresponding to the at least one index segment. The storage module 830 stores the at least one index segment at a storage location corresponding to the storage location information, so that a client can obtain the at least one index segment from the storage location. Typically, the storage module is an HTTP server.

In the embodiment of the present invention, the index information of the media segment is provided by the index segment independent of the media segment, so that the client can obtain the index segment according to requirements, thereby reducing unnecessary data transmission and saving bandwidth.

In addition, in the embodiment of the present invention, a format of the media segment may not be changed, an existing content preparation device can still be used, and an existing encoding representation can still be used, thereby saving transformation cost. In addition, according to the embodiment of the present invention, more metadata may be further allowed to be encapsulated in the index segment, so as to improve transmission efficiency.

Figure 9:
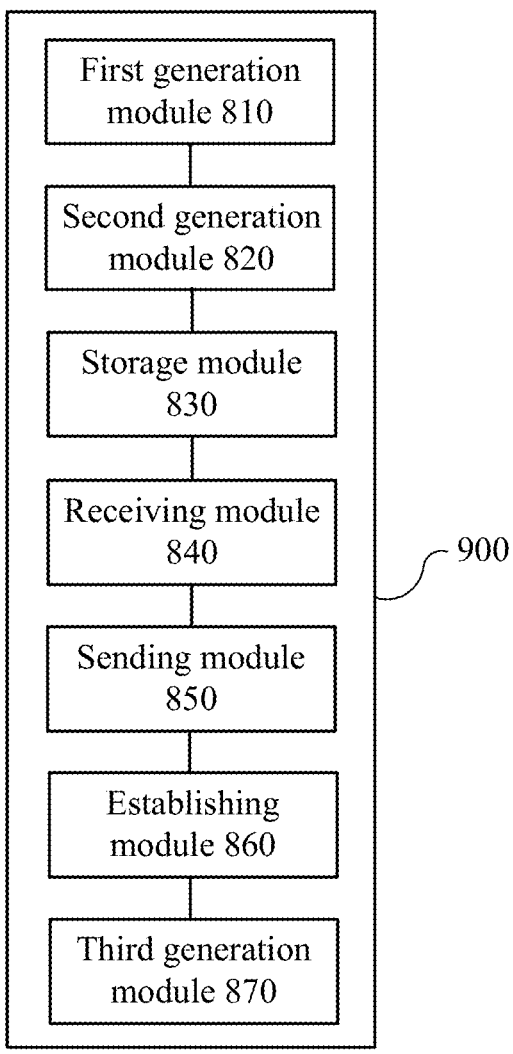
FIG. 9 is a block diagram of a device for transmitting streaming media according to another embodiment of the present invention.

FIG. 9 is a block diagram of a device for transmitting streaming media according to another embodiment of the present invention. Detailed descriptions of components in FIG. 9 that are the same as or similar to those of FIG. 8 are omitted. The difference between a device 900 in FIG. 9 and the device in FIG. 8 lies in that, the device 900 may further include a receiving module 840 and a sending module 850. The receiving module 840 may receive a request for a specific index segment in at least one index segment from a client, where the request carries storage location information corresponding to the specific index segment. The sending module 850 may send the specific index segment to the client.

Optionally, in another embodiment, the device 900 further includes an establishing module 860, configured to establish a generation rule of storage location information corresponding to the at least one index segment.

Optionally, in another embodiment, the device 900 further includes a third generation module 870, configured to generate a media presentation description file, where the media presentation description file carries the generation rule.

For other functions and operations of the device 800 and device 900, reference may be made to processes involving the server in the method embodiments of FIG. 2, FIG. 4 and FIG. 5. To avoid repetition, the detailed description is not provided again.

In the embodiment of the present invention, the index information of the media segment is provided by the index segment independent of the media segment, so that the client can obtain the index segment according to requirements, thereby reducing unnecessary data transmission and saving bandwidth.

In addition, in the embodiment of the present invention, a format of the media segment may not be changed, an existing content preparation device can still be used, and an existing encoding representation can still be used, thereby saving transformation cost. In addition, according to the embodiment of the present invention, more metadata may be further allowed to be encapsulated in the index segment, so as to improve transmission efficiency.

Figure 10:
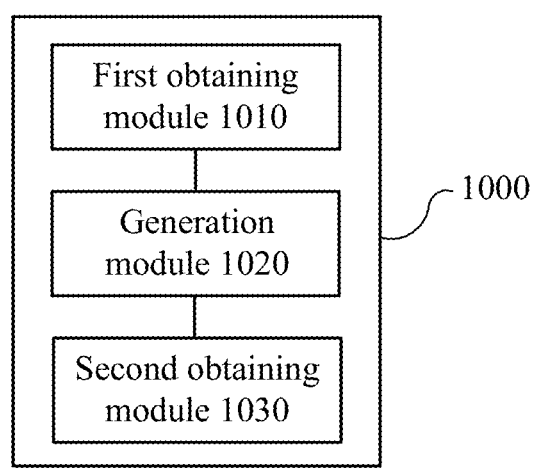
FIG. 10 is a block diagram of a device for transmitting streaming media according to an embodiment of the present invention.

FIG. 10 is a block diagram of a device for transmitting streaming media according to an embodiment of the present invention. An example of a device 1000 in FIG. 10 is a client (for example, the client 120 in FIG. 1). The device 1000 includes a first obtaining module 1010, a generation module 1020 and a second obtaining module 1030.

The first obtaining module 1010 obtains a generation rule of storage location information corresponding to at least one index segment, where the at least one index segment includes index information of at least one media segment, and the at least one index segment is independent of the at least one media segment. The generation module 1020 generates the storage location information corresponding to the at least one index segment according to the generation rule. The second obtaining module 1030 obtains the at least one index segment from a storage location corresponding to the storage location information.

For other functions and operations of the device 1000, reference may be made to processes involving the client in the method embodiments of FIG. 3, FIG. 5 and FIG. 7. To avoid repetition, the detailed description is not provided again. For example, the first obtaining module 1010 may obtain a media presentation description file, where the media presentation description file carries the generation rule. The second obtaining module 1030 may send a request for a specific index segment in the at least one index segment to a server, where the request carries storage location information corresponding to the specific index segment; and receive the specific index segment from the server.

In the embodiment of the present invention, the index information of the media segment is provided by the index segment independent of the media segment, so that the client can obtain the index segment according to requirements, thereby reducing unnecessary data transmission and saving bandwidth.

In addition, in the embodiment of the present invention, a format of the media segment may not be changed, an existing content preparation device can still be used, and an existing encoding representation can still be used, thereby saving transformation cost. In addition, according to the embodiment of the present invention, more metadata may be further allowed to be encapsulated in the index segment, so as to improve transmission efficiency.

Persons of ordinary skill in the art may realize that, units and algorithm steps of examples described in the embodiments disclosed by the application can be implemented by electronic hardware, or a combination of computer software and electronic hardware. Whether the functions are executed by hardware or software is decided by a specific application and design constraint condition of the technical solution. For each specific application, professional technical staff may use different methods to implement the described functions, but the implementation should not be construed as exceeding the scope of the present invention.

Persons skilled in the art may clearly understand that, for the convenience and conciseness of the description, for specific working processes of the system, apparatus and unit described above, reference may be made to the corresponding processes in the previous method embodiments, which will not be described herein again.

In the embodiments provided in the present application, it should be noted that, the disclosed system, apparatus and method may be implemented in other manners. For example, the apparatus embodiments described above is merely exemplary. For example, the division of the units is merely a logic functional division, and other division manners may be adopted in practical implementation. For example, multiple units or components may be combined or integrated into another system, or some features may be neglected or not executed. In addition, the shown or discussed inter-coupling, direct coupling or communication connection may be implemented through some interfaces. Indirect coupling or communication connection of apparatus or unit may be electrical, mechanical or in other manners.

Units described as separate components may or may not be physically separated. Components shown as units may or may not be physical units, that is, units may be integrated, or distributed to a plurality of network units. According to actual demands, some or all of the units may be selected to achieve the objective of the solution of the embodiment.

In addition, the functional units in the embodiments of the present invention may either be integrated in a processing unit, or each be a separate physical unit; alternatively, two or more of the units are integrated in one unit.

If implemented in the form of software functional units and sold or used as an independent product, the functions may also be stored in a computer readable storage medium. Based on such understanding, the technical solutions of the present invention or the part that makes contributions to the prior art can be embodied in the form of a software product.

The computer software product may be stored in a storage medium, for example, containing several instructions adapted to instruct computer equipment (for example, a personal computer, a server, or network equipment) to perform all or a part of steps of the method according to the embodiments of the present invention. The foregoing storage media include: a USB flash disk, a removable hard disk, a read-only memory (ROM, Read-Only Memory), a random access memory (RAM, Random Access Memory), a magnetic disk, an optical disk, or other various media capable of storing program codes.

The above description is only the specific implementation manners of the present invention, but the protection scope of the present invention is not limited thereto. Any change or replacement that can be easily thought of by persons skilled in the art within the technical scope disclosed by the present invention shall fall within the protection scope of the present invention. Therefore, the protection scope of the present invention is subject to the protection scope of the claims.

What is claimed is:

1. A method for transmitting streaming media, comprising:
generating at least one index segment, wherein the at least one index segment comprises index information of at least one media segment, and the at least one index segment and the at least one media segment are separate;
generating storage location information corresponding to the at least one index segment according to a generation rule of the storage location information corresponding to the at least one index segment; and
storing the at least one index segment at a storage location corresponding to the storage location information, so that a client obtains the at least one index segment from the storage location; and
wherein:
an index segment of the at least one index segment comprises index information of media segments from multiple encoding representations, wherein durations of the media segments of different encoding representations are different, wherein time boundaries of the at least one index segment and time boundaries of the at least one media segment are not aligned, wherein a particular media segment partially falls within a time range of a particular one index segment, and the particular one index segment only records index information of the particular one media segment that falls within the time range of the particular one index segment; or
an index segment of the at least one index segment comprises index information of media segments of each encoding representation in the same time range, wherein boundaries of the index segment and the media segments are aligned; or
an index segment of the at least one index segment only comprises index information of one media segment of one encoding representation, wherein a duration of an index segment is equal to a duration of a media segment; or
an index segment of the at least one index segment is corresponding to an encoding representation and comprises information of multiple media segments from the encoding representation, wherein a duration of the index segment is the sum of durations of multiple media segments of the encoding representation.

2. The method according to claim 1, further comprising:
receiving a request for a specific index segment in the at least one index segment from the client, wherein the request carries storage location information corresponding to the specific index segment; and
sending the specific index segment to the client.

3. The method according to claim 1, further comprising:
establishing the generation rule of the storage location information corresponding to the at least one index segment.

4. The method according to claim 1, further comprising:
generating a media presentation description file, wherein the media presentation description file carries the generation rule.

5. The method according to claim 1, wherein the generation rule is indicated through a uniform resource locator template.

6. The method according to claim 1, wherein the at least one media segment belongs to one encoding representation, or belongs to multiple encoding representations.

7. The method according to claim 1, wherein the at least one index segment is temporally continuous and has a continuous sequence number.

8. The method according to claim 1, wherein the at least one index segment further comprises at least one of the following: an identifier of the encoding representation to which the at least one media segment belongs, an identifier of the at least one media segment, and an identifier of a subsegment in the at least one media segment.

9. A method for transmitting streaming media, comprising:
obtaining a generation rule of storage location information corresponding to at least one index segment, wherein the at least one index segment comprises index information of at least one media segment, and the at least one index segment is independent of the at least one media segment;
generating storage location information corresponding to the at least one index segment according to the generation rule; and
obtaining the at least one index segment from a storage location corresponding to the storage location information; and
wherein:
an index segment of the at least one index segment comprises index information of media segments from multiple encoding representations, wherein durations of the media segments of different encoding representations are different, wherein time boundaries of the at least one index segment and time boundaries of the at least one media segment are not aligned, wherein a particular media segment partially falls within a time range of a particular one index segment, and the particular one index segment only records index information of the particular one media segment that falls within the time range of the particular one index segment; or
an index segment of the at least one index segment comprises index information of media segments of each encoding representation in the same time range, wherein boundaries of the index segment and the media segments are aligned; or
an index segment of the at least one index segment only comprises index information of one media segment of one encoding representation, wherein a duration of an index segment is equal to a duration of a media segment; or an index segment of the at least one index segment is corresponding to an encoding representation and comprises information of multiple media segments from the encoding representation, wherein a duration of the index segment is the sum of durations of multiple media segments of the encoding representation.

10. The method according to claim 9, wherein the obtaining the at least one index segment from the storage location corresponding to the storage location information comprises:
sending a request for a specific index segment in the at least one index segment to a server, wherein the request carries storage location information corresponding to the specific index segment; and
receiving the specific index segment from the server.

11. The method according to claim 9, wherein the obtaining the generation rule of the storage location information corresponding to the at least one index segment comprises:
obtaining a media presentation description file, wherein the media presentation description file carries the generation rule.

12. The method according to claim 9, wherein the generation rule is indicated through a uniform resource locator template.

13. The method according to claim 9, wherein the at least one media segment belongs to one encoding representation, or belongs to multiple encoding representations.

14. The method according to claim 9, wherein the at least one index segment is temporally continuous and has a continuous sequence number.

15. The method according to claim 9, wherein the at least one index segment further comprises at least one of the following: an identifier of the encoding representation to which the at least one media segment belongs, and/or an identifier of the at least one media segment, and/or an identifier of a subsegment in the at least one media segment.

16. A device for transmitting streaming media, comprising:
a memory for storing computer executable instructions; and
a processor operatively coupled to the memory, the processor being configured to execute the computer-executable instructions to:
generate at least one index segment, wherein the at least one index segment comprises index information of at least one media segment, and the at least one index segment and the at least one media segment are separate;
generate storage location information corresponding to the at least one index segment according to a generation rule of the storage location information corresponding to the at least one index segment; and
store the at least one index segment at a storage location corresponding to the storage location information, so that a client obtains the at least one index segment from the storage location; and
wherein:
an index segment of the at least one index segment comprises index information of media segments from multiple encoding representations, wherein durations of the media segments of different encoding representations are different, wherein time boundaries of the at least one index segment and time boundaries of the at least one media segment are not aligned, wherein a particular media segment partially falls within a time range of a particular one index segment, and the particular one index segment only records index information of the particular one media segment that falls within the time range of the particular one index segment; or
an index segment of the at least one index segment comprises index information of media segments of each encoding representation in the same time range, wherein boundaries of the index segment and the media segments are aligned; or
an index segment of the at least one index segment only comprises index information of one media segment of one encoding representation, wherein a duration of an index segment is equal to a duration of a media segment; or
an index segment of the at least one index segment is corresponding to an encoding representation and comprises information of multiple media segments from the encoding representation, wherein a duration of the index segment is the sum of durations of multiple media segments of the encoding representation.

17. The device according to claim 16, the processor being further configured to execute the computer-executable instructions to:
receive a request for a specific index segment in the at least one index segment from the client, wherein the request carries storage location information corresponding to the specific index segment; and
send the specific index segment to the client.

18. The device according to claim 16, the processor being further configured to execute the computer-executable instructions to:
establish the generation rule of the storage location information corresponding to the at least one index segment.

19. The device according to claim 16, the processor being further configured to execute the computer-executable instructions to:
generate a media presentation description file, wherein the media presentation description file carries the generation rule.

20. A device for transmitting streaming media, comprising:
a memory for storing computer executable instructions; and
a processor operatively coupled to the memory, the processor being configured to execute the computer-executable instructions to:
obtain a generation rule of storage location information corresponding to at least one index segment, wherein the at least one index segment comprises index information of at least one media segment, and the at least one index segment is independent of the at least one media segment;
generate storage location information corresponding to the at least one index segment according to the generation rule; and
obtain the at least one index segment from a storage location corresponding to the storage location information; and
wherein:
an index segment of the at least one index segment comprises index information of media segments from multiple encoding representations, wherein durations of the media segments of different encoding representations are different, wherein time boundaries of the at least one index segment and time boundaries of the at least one media segment are not aligned, wherein a particular media segment partially falls within a time range of a particular one index segment, and the particular one index segment only records index information of the particular one media segment that falls within the time range of the particular one index segment; or an index segment of the at least one index segment comprises index information of media segments of each encoding representation in the same time range, wherein boundaries of the index segment and the media segments are aligned; or an index segment of the at least one index segment only comprises index information of one media segment of one encoding representation, wherein a duration of an index segment is equal to a duration of a media segment; or an index segment of the at least one index segment is corresponding to an encoding representation and comprises information of multiple media segments from the encoding representation, wherein a duration of the index segment is the sum of durations of multiple media segments of the encoding representation.

21. The device according to claim 20, wherein the processor being further configured to execute the computer-executable instructions to:

obtain a media presentation description file, wherein the media presentation description file carries the generation rule.

22. The device according to claim 20, wherein the processor being further configured to execute the computer-executable instructions to:

send a request for a specific index segment in the at least one index segment to a server, wherein the request carries storage location information corresponding to the specific index segment; and receive the specific index segment from the server.

23. A system process for transmitting streaming media, comprising:

a server, comprising a processor, configured to generate at least one index segment, wherein the index segment includes index information of at least one media segment, and the index segment and the media segment are separate, to establish a generation rule of storage location information corresponding to the at least one index segment, to generate the storage location information corresponding to the at least one index segment according to the generation rule, to store the at least one index segment at a storage location corresponding to the storage location information, and to generate a media presentation description file, wherein the media presentation description file carries the generation rule of the storage location information of the at least one index segment; and a client, comprising a processor, in communication with the server and configured to obtain the media presentation description file from the server, to generate the storage location information of the index segment according to the generation rule carried in the media presentation description file, and to request the index segment from the server, wherein the server sends the index segment requested by the client to the client; and wherein:

an index segment of the at least one index segment comprises index information of media segments from multiple encoding representations, wherein durations of the media segments of different encoding representations are different, wherein time boundaries of the at least one index segment and time boundaries of the at least one media segment are not aligned, wherein a particular media segment partially falls within a time range of a particular one index segment, and the particular one index segment only records index information of the particular one media segment that falls within the time range of the particular one index segment; or an index segment of the at least one index segment comprises index information of media segments of each encoding representation in the same time range, wherein boundaries of the index segment and the media segments are aligned; or an index segment of the at least one index segment only comprises index information of one media segment of one encoding representation, wherein a duration of an index segment is equal to a duration of a media segment; or an index segment of the at least one index segment is corresponding to an encoding representation and comprises information of multiple media segments from the encoding representation, wherein a duration of the index segment is the sum of durations of multiple media segments of the encoding representation.

* * * * *